(12) United States Patent
Roth et al.

(10) Patent No.: US 9,602,482 B1
(45) Date of Patent: Mar. 21, 2017

(54) AUTHENTICATION FOR AN API REQUEST

(71) Applicant: Amazon Technologies, Inc., Reno, NV (US)

(72) Inventors: Gregory Branchek Roth, Seattle, WA (US); William Frederick Kruse, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 14/104,986

(22) Filed: Dec. 12, 2013

(51) Int. Cl.
*H04L 9/00* (2006.01)
*H04L 29/06* (2006.01)

(52) U.S. Cl.
CPC ............ *H04L 63/08* (2013.01); *H04L 63/20* (2013.01)

(58) Field of Classification Search
CPC ....................................................... H04L 63/08

USPC ...................................................... 726/1, 4–7
See application file for complete search history.

(56) References Cited

U.S. PATENT DOCUMENTS

| | | | |
|---|---|---|---|
| 2002/0165957 A1* | 11/2002 | Devoe et al. ................. | 709/224 |
| 2003/0208621 A1* | 11/2003 | Bowman ...................... | 709/242 |
| 2003/0226036 A1* | 12/2003 | Bivens et al. ................ | 713/201 |
| 2008/0040491 A1* | 2/2008 | Minodier et al. ............. | 709/229 |
| 2009/0235349 A1* | 9/2009 | Lai et al. ...................... | 726/14 |

* cited by examiner

*Primary Examiner* — Alexander Lagor

(74) *Attorney, Agent, or Firm* — Thorpe North & Western LLP

(57) ABSTRACT

Technology for managing an API request is described. In an example implementation, an authentication service may receive a request to access a service. The authentication service may be configured to determine a proximity of a client device from which the request originated to the service. The authentication service may be further configured to grant the request based in part on the determined proximity of the client device to the service with respect to a policy.

22 Claims, 9 Drawing Sheets

AUTHENTICATION FOR AN API REQUEST

BACKGROUND

Network-based services exist that allow customers to purchase and utilize virtual computing resources, such as virtual machine instances on a permanent or as-needed basis. In addition to virtual machine instances, these services typically allow customers to purchase and utilize other types of computing resources for use with the virtual machine instances. For example, customers may be permitted to purchase and utilize virtual data storage, virtual networking resources, and other types of virtual resources.

The use of third-party network-based services may be convenient for many customers wishing to avoid the work and expense of establishing and maintaining similar services. For example, some network-based services may utilize dozens of data centers around the world, hundreds of thousands or even millions of server computers, along with large numbers of networking components, software applications, and other types of resources.

Communications between network-based services and customer devices may be performed in a number of ways, including API (application programming interface) calls, remote function calls or other types of network based communications. However, security precautions may be desirable to prevent unauthorized devices from accessing the service or otherwise compromising the information communicated between the service and the customer devices.

DETAILED DESCRIPTION

Figure 1:
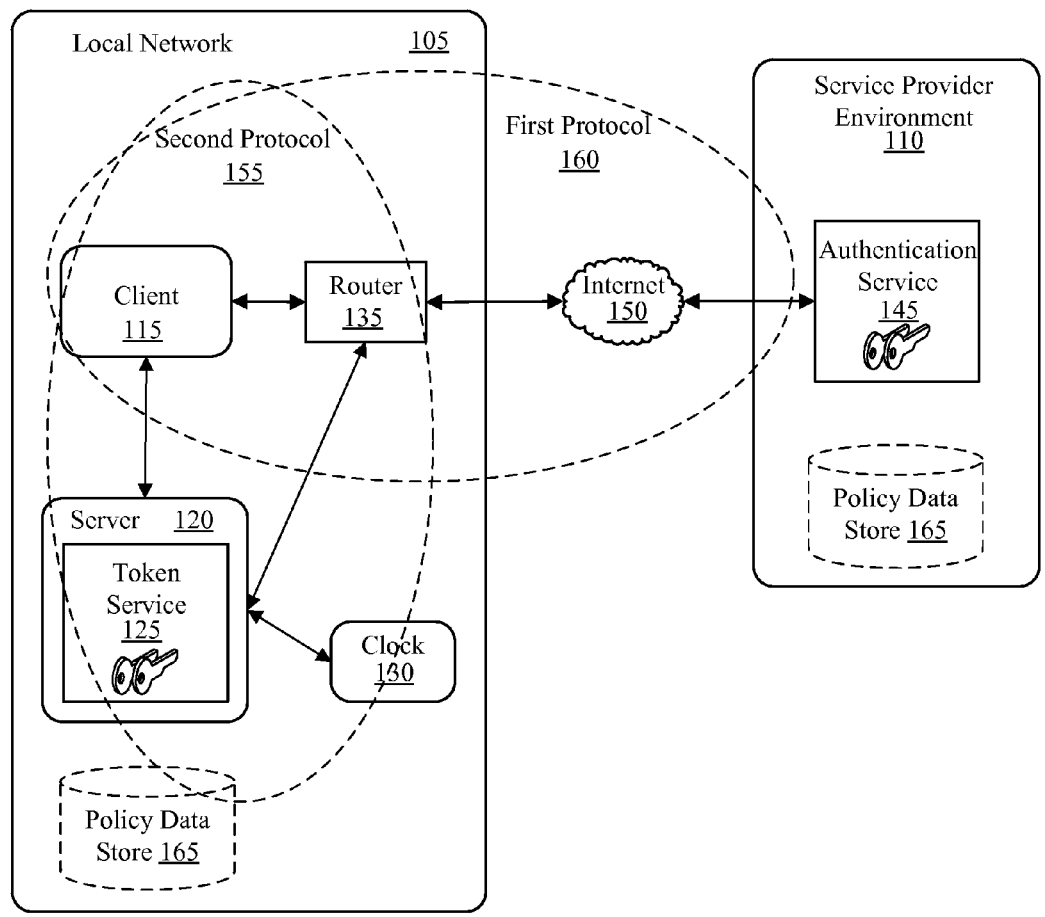
FIG. 1 is a schematic overview of a system for managing authentication material for an API request in accordance with an example of the present technology.

The present technology may be used to manage and authenticate API (Application Programming Interface) requests. For example, an API request may be received at an authentication service. The API request may include authentication material generated by a token service based in part on a network traversal of packets between a client device to the token service. The authentication material may be authenticated by comparing the authentication material in the API request with an authentication policy. A response to the API request may be generated based in part on a result of comparing the authentication information in the API request with the authentication policy, and the authentication policy may include a network traversal restriction to restrict authentication of the authentication material based on the network traversal of the API request.

In another example, a system for managing API requests may include any number of computing nodes, each of which may include at least one processor and a memory. The computing node(s) may be configured to collectively implement a local network usable to access a service provider environment that may provide a service, such as a virtual compute service, storage service or the like and which may be offered by a service provider. The service provider environment may be external to the local network. The system may be implemented to include or use a first communication protocol usable from the local network to reach the virtual compute service. The system may further be implemented to include or use a second communication protocol usable by clients connected to the local network and unusable by clients external to the local network. A token service may be hosted on the local network to generate authentication material for the client to include with an API request for the virtual compute service. The client may receive the authentication material using the second protocol and may send the API request containing the authentication material to the virtual compute service using the first protocol.

In another example, the technology may operate as a system for sending an API request. The system may operate as or include a token service hosted on a customer network, such as a local area network (LAN) or wide area network (WAN), for example, to generate authentication material for the API request based at least in part on a network traversal of packets from a client device to the token service. The token service may communicate with clients on the customer network over a communication protocol routable over the customer network and non-routable over the internet or externally from the customer network. The token service may utilize a policy stored in a policy data store for determining whether or how to generate or send the authentication material for the API request based on the network traversal of the packets from the client device.

In another example, the technology may operate as a system for receiving an API request. For example, the system may operate as or include an authentication service to receive a request to access a service from a service provider. The authentication service may be configured to grant the request based in part on a proximity of a client device to the authentication service. The proximity of the client device may be determined according to a gateway through which the request was received, a remaining TTL (Time To Live) value associated with the packets or any other suitable method.

In another example, the technology may provide for validation of API requests. In this example, acceptable authentication material may be coordinated between a remote token service and an authentication service. An API request may be received at the authentication service from a client. The API request may optionally be signed using a key, such as a private key of a public-private key pair, and the request may further include the acceptable authentication material as provided to the client from the remote token service. The API request may be validated at the authentication service by ensuring the accuracy of the acceptable authentication material.

FIG. 1 is a schematic overview of a system for managing API requests in accordance with an example of the present technology. The system may be implemented in any of a variety of configurations. The examples in the figures are for illustration purposes and are not intended to be limiting of potential configurations or implementations.

Customers of network-based services provided by a service provider often desire to restrict where the customer's account may be used rather than allow the account to be used from any location. For example, due to security concerns, customers may desire to limit access to the network-based services access requests from the customer's local network 105 to the exclusion of other access requests. The network services or the service provider environment 110 where the network services are available may be external to the local network. One example implementation for restricting access in this manner may include building or providing a service, such as token service 125 that may run on a server 120 on the customer's local network 105, and the token service 125 may vend authentication material to a client device 115 at the request of a user (e.g., the customer or the employee) on the local network 105.

The local network 105 may communicate with the service provider environment 110 over the internet 150 using a first communication protocol 160 (also referred to herein as simply the "first protocol"). For example, the first communication protocol may be used to reach a virtual compute service provided by the service provider at the service provider environment 110. For example, the first protocol may be a routable protocol like TCP\IP (transmission control protocol\internet protocol). The local network may communicate with client devices 115, servers 120 and the like connected to the local network using a second communication protocol 155 (as referred to herein as simply "second protocol"). For example, the local network may include a router 135 and the messages or packets for the second protocol may not be able to pass through the router. The router may be a network gateway and may operate as an internetworking device for joining together two networks (i.e., the local network 105 and the internet 150) that use different base protocols (i.e., the first protocol 160 and the second protocol 155). Communications within the local network 105 may be performed using the second protocol 155 while communications from the local network to the internet 150 or another network may be performed using the first protocol 160.

In the example of FIG. 1, the second protocol 155 may be a protocol that is routable within the local network 105 and non-routable outside of the local network 105. DHCP, or a variation thereof, as an example may be used to route traffic over the local network 105. In other words, the second communication protocol may be usable by clients connected to the local network and unusable by clients external to the local network. The first protocol 160 used for traffic routed over the internet 150 may be the internet protocol. The first and second protocols 160, 155 may co-exist on the local network 105. For example, TCP/IP may be layered on top of another protocol within the local network 105. In this example, the server 120 may communicate with the client 115 using the second protocol 155 and the client 115 may use the first protocol 160 to communicate with the router 135 or other network devices, and the client 115 may send communications over the internet 150 using the first protocol 150 (such as via router 135).

The first and/or second protocols 160, 155 may include any suitable protocol, such as existing protocols, modified protocols of existing protocols and any other protocols. Some non-limiting examples include various protocols and modifications thereof from what may be referred to as the internet protocol suite, and which may include, for example: Dynamic Host Configuration Protocol (DHCP), Domain Name Protocol (DOMAIN), Routing Protocols (RIP, OSPF, EGP, and BGP), File Transfer Protocol (FTP), Network File System Protocol (NFS), Telnet Protocol (TELNET), Trivial File Transfer Protocol (TFTP), Finger Protocol (FINGER), Simple Mail Transfer Protocol (SMTP), Simple Network Manager Protocol (SNMP), User Datagram Protocol (UDP), Transmission Control Protocol (TCP), Internet Protocol (IP), Address Resolution Protocol (ARP), Internet Control Message Protocol (ICMP), Internet Group Management Protocol (IGMP), Network Time Protocol (NTP), Time Synchronization Protocol (TSP), Internetwork Packet Exchange (IPX) protocol, Sequenced Packet Exchange (SPX) protocol, net 40 protocol, and/or any of a number of other different protocols and variations thereof.

A token service 125 may be hosted on a server 120 on the local network 105. The token service 125 may generate authentication material for the client 115 to include with an API request for a virtual compute service. For example, the API request may be a request to access virtual compute service resources through the service provider environment 110. The client 115 may receive the authentication material from the token service 125 using the second protocol 155 and may send the API request containing the authentication material to the virtual compute service using the first protocol 160. Thus, the client 115 may receive the authentication material over the second protocol 155 and may send or cause the API request to be sent over the first protocol 160, such as via router 135.

In some instances, an administrator of the local network 105 may desire to enable users on multiple local area networks (LANs) the ability to reach the service provider environment 110. This may be accomplished using a single token service 125 by installing a forwarding agent on the LANs. For example, a forwarding agent (e.g., a bridge or VLAN (virtual local area network) protocol with a router) may receive a request for authentication material using the second protocol 155 and may encapsulate the request in packets to be sent using the first protocol 160 from one LAN to another LAN (e.g., local network 105) hosting the token service 125, at which location the request may be unwrapped to be transmitted around the LAN hosting the token service 125 using the second protocol 155. Once the authentication material has been generated, the authentication material may be returned to the originating LAN in a reverse process for the request.

The authentication service 145 may be hosted in the service provider environment 110. The authentication service 145 may receive API requests for access to the network-based services provided in the service provider environment 110. The authentication service 145 may evaluate requests to determine whether to grant access to the network-based services. For example, the authentication service 145 may grant access for requests including the authentication material and may deny access for requests without the authentication material. Because the authentication material may be vended and routed from the token service 125 using the second protocol 155, client devices not connected to the local network 105 may be unable to obtain the authentication material and unable to access the network-based services. An assumption may be made at the authentication service 145 that if the authentication material is included in the request that the client device 115 from which the request originated is on an authorized network (i.e., local network 105) and is authorized to access the local network 105.

In addition to verifying the presence and/or authenticity of authentication material included in a request for access to the service provider environment 110, the authentication service 145 may further evaluate validity of the request by verifying user credentials, decrypting contents of the request encrypted using encryption keys and so forth. For example, a request may be signed using a private key of a public-private key pair and the authentication service 145 may decrypt the request using a corresponding public key from the public-private key pair. The authentication material may be in an encrypted payload of the packet(s) comprising the request. The encryption is not limited to any particular implementation. Some non-limiting examples of encryption that may be used with this technology may include asymmetric or symmetric key cryptography, RSA cryptography, MAC (message authentication code) cryptography and so forth.

The token service 125 and the authentication service 145 may optionally communicate to coordinate or agree on acceptable authentication material. For example, the authentication material may change periodically and the token service may instruct the authentication service of what the acceptable authentication material is or will be. The token service 125 and/or the authentication service 145 may continually update an acceptable authentication material cache for use when a client sends an API request or when an API request is received. In an alternative example, the authentication service may periodically instruct the token service of what the acceptable authentication material is or will be.

In another example, the authentication service 145 and the token service 125 may be configured to each arrive at the acceptable authentication material in the absence of coordination or other communication between the services, even when the acceptable authentication material is changed. In one example, the token service 125 and the authentication service 145 may have a shared method for generating coordinated authentication material. Further, the token service 125 may access a clock 130 to generate the authentication material based on a current time of the clock 130. The authentication service 145 may have access to a system clock that is generally synchronized with clock 130 in order to verify the authentication material. The token service 125 and the authentication service 145 may utilize a same method for determining the acceptable authentication material based on the current time. Thus, the token service 125 and/or the authentication service 145 may generate or calculate acceptable authentication material when a client sends an API request or when an API request is received.

The token service 125 may utilize a policy data store 165 that may reside on the local network 105 for use by the token service. Alternatively, the policy data store 165 may reside in the service provider environment 110 for use by the authentication service 145. The policy data store 165 may store a policy for use in determining whether to vend authentication material, how to vend the authentication material, whether to validate received authentication material, and so forth depending on the context and location of use, as will be described in further detail later.

The network-based services offered by the service provider environment 110 and to which the authentication service 145 system may grant access when acceptable authentication material is received may include a virtual computing services. A user may operate one or more virtual computing instances to execute an operating system and computing applications. A user may create, launch, and terminate virtual computing instances as desired. The user may have some control over the geographical location of virtual computing instances to optimize latency and provide high levels of redundancy.

The user may access and manage the one or more virtual computing instances over a network connection, such as a connection through the Internet 150, for example. The user may perform various operations on the virtual computing instance(s) such as adding, updating, modifying, deleting or other otherwise maintaining software or services on the virtual computing instance. These operations may be performed by the user from the client device 115.

The virtual computing instance may be part of a virtualization computing environment in the service provider environment 110, which may include a virtual distributed computing system with a virtualization layer executing on a hardware layer. The hardware layer may include a plurality of physical computers, servers or processing nodes. The virtualization layer (e.g., hypervisor) may provide a platform on which virtual computing instances may be created. In other words, the virtual computing instances may execute on the hardware layer by using the platform provided by the virtualization layer.

As used herein "virtual computing" may refer to the use of computing resources (hardware and software) which may be available at a remote location from the users of the computing resources and the virtual computing resources may be accessible over a network, such as the Internet 150. Users may be able to buy these computing resources (including storage, computing power and networking) as a utility on demand and sometimes by the hour. Virtual computing entrusts remote services with a user's data, software and computation. Use of virtual computing resources can provide a number of advantages including cost advantages and/or ability to adapt rapidly to changing computing resource needs.

Web services may be associated with the virtual computing. A web service may be a software function provided at a network address over the web or the internet. Client devices 115 may initiate requests to servers and the servers may process requests and return the appropriate responses. The client requests are typically initiated using an API (application programming interface) request. An example of a networked API is a programmatic interface to a defined request-response message system, sometimes expressed in JSON (JavaScript Object Notation) or XML (Extensible Markup Language), which is often exposed via the web by means of an HTTP (Hypertext Transfer Protocol)-based web server.

Client-side endpoint configuration can be accomplished by allowing a client to include as part of a network request (e.g., an API request), a desired endpoint for subsequent notifications from a server. The endpoint can be an endpoint identifier, such as a Uniform Resource Identifier (URI) or a domain name. The URI can be a variety of types of identifiers, such as Uniform Resource Locators (URL) or a Uniform Resource Name (URN). The URI can include an IP (Internet Protocol) address/hostname. When a web service receives the API request from a client device, the web service can generate a response to the request and send the response to the endpoint identified in the request.

A service provider environment 110 may be capable of delivery of computing and storage capacity as a service to a community of end recipients. In an example embodiment, the service provider environment 110 may be established for an organization (i.e., a "customer") by or on behalf of the organization. That is, the service provider may offer a "virtual private cloud environment." In another embodiment, the service provider environment 110 may support a multi-tenant environment, wherein a plurality of customers may operate independently (i.e., a public cloud environment). Generally speaking, the service provider environment 110 may provide the following models: Infrastructure as a Service ("IaaS"), Platform as a Service ("PaaS"), and/or Software as a Service ("SaaS"). Other models may also be provided. For the IaaS model, the service provider environment 110 may offer computers as physical or virtual machines and other resources. The virtual machines may be run as guests by a hypervisor. The PaaS model may deliver a computing platform that can include an operating system, programming language execution environment, database, and web server. Application developers may develop and run software solutions in the service provider environment 110 without the cost of buying and managing the underlying hardware and software. The SaaS model allows installation and operation of application software in the service provider environment 110. In some embodiments, end users may access the service provider environment 110 using networked client devices, such as desktop computers, laptops, tablets, smartphones, etc running web browsers or other lightweight client applications.

In one example, a service provider environment 110 may include any number of server computers. The server computers may provide computing resources for executing software or virtual computing instances, which may also be referred to as virtual computer instances or virtual machines. A virtual machine may be an instance of a software implementation of a machine (i.e. a computer) that executes applications like a physical machine. In the example of virtual machine, each server may be configured to execute an instance manager capable of executing the virtual computing instances. The instance manager may be a hypervisor or another type of program configured to enable the execution of multiple instances on a single server. Additionally, each of the instances may be configured to execute one or more applications.

It should be appreciated that although the embodiments disclosed herein are described primarily in the context of virtual computing instances or virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

Figure 2A:
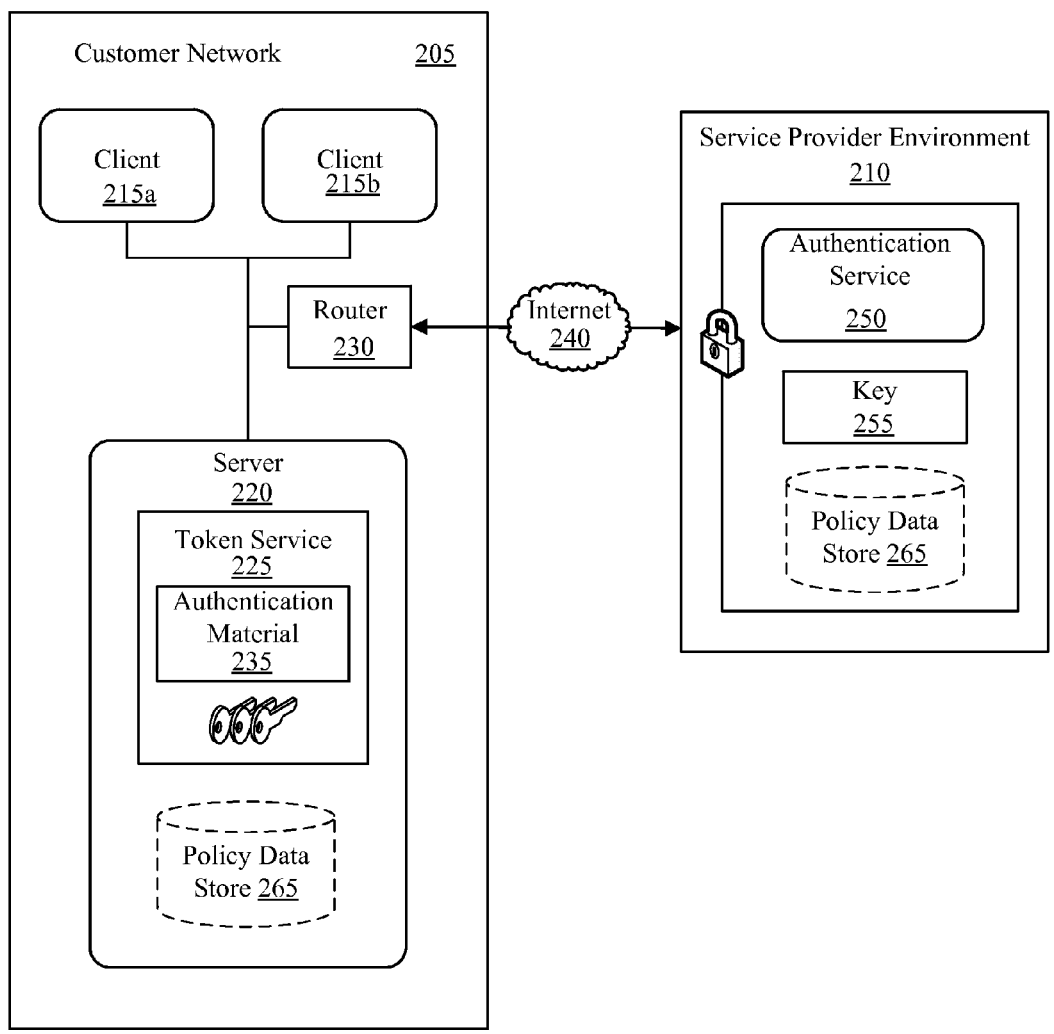
FIG. 2A is a schematic overview of a system implemented across a customer network and a service provider environment for authenticating an API request using authentication material and an encryption key in accordance with an example of the present technology.

Referring now to FIG. 2A, an example implementation of the present technology is illustrated which is similar in some regards to the example of FIG. 1. In this example, the first and second protocols described with regards to FIG. 1 may be implemented or may optionally be omitted. For example, various aspects of network traversal may be considered when implementing a policy for managing authentication and authentication material, as will be described later.

A server 220 on a customer network 205 is configured to execute a token service 225 for generating authentication material 235 for use by clients 215a, 215b in accessing an authentication service 250 at a service provider environment 210 over a network such as the internet 240 via router 230. Access the service provider environment 210 may be granted, for example, when the authentication material 235 is validated using the authentication service 250, and further when a key 255 of a symmetrical or asymmetrical key pair is usable to decrypt a request for access to the service provider environment 210.

The customer network 205 may be an suitable type of customer network, such as one of a LAN (Local Area Network), WLAN (Wireless Local Area Network), WAN (Wide Area Network), MAN (Metropolitan Area Network), SAN (Storage Area Network, System Area Network, Server Area Network, or Small Area Network), CAN (Campus Area Network, Controller Area Network, or Cluster Area Network), PAN (Personal Area Network), DAN (Desk Area Network) and so forth.

The token service 225 may implement a policy stored in a policy data store 265 for determining whether to generate the authentication material 235 or for restricting access to the authentication material 235. For example, the policy may be implemented based on a network traversal of packets to or from the token service 225. Network traversal, as used herein, may refer to a variety of characteristics relating to traversal of packets across a network from one location to another. More specifically, network traversal may refer to, for example, a path or route taken by the packets (such as may be determined from a traceroute operation, for example), a latency of the packets (referring to an elapsed time from which the packets are sent from a source until the packets reach a destination), a hop count (a hop refers to one portion of the path between a source and a destination; data packets may pass through routers and gateways on the way from the source to the destination and each time packets are passed to the next device, a hop occurs), a port over which packets are sent, a network topology of a network from which the packets originate or across which the packets traverse to the destination, and so forth.

In an example implementation of FIG. 2A, a hop count may be used to restrict the authentication material 235. For example, if a maximum hop limit for a packet is '255' then packets originating on the customer network may have a hop limit set at '255'. The token service 225 may evaluate the packets requesting authentication material 235 arriving at the token service 225 to determine whether a hop count of the packets has been decremented more than a maximum predetermined number of hops. If a network administrator understands that a maximum number of hops from any point on the customer network 205 to the server 220 is '5', for example, and a packet requesting authentication material arrives at the token service 225 with TTL (time to live) value of '120', the packet has passed through '135' hops and may have originated from outside the network. The token service 225 may reject or drop the request without generating or otherwise providing the authentication material.

Time to live (TTL), also referred to as hop limit or hop count, is a mechanism that limits the lifespan or lifetime of data in a computer or network. TTL may be implemented as a counter attached to or embedded in the data packets. Once the prescribed event count or timespan has elapsed, the data packets are discarded or dropped.

As another example, the token service 225 may accept each request for authentication material 235 and may send the packets containing the authentication material 235 in response to each request, but may set an artificially low TTL value for the packets containing the authentication material. Using the example above where the maximum number of hops from any point on the customer network 205 to the server 220 is '5', the token service 225 may set the TTL value to '5' and any device that is more than '5' hops distant from the token service 225 may be unable to receive the authentication material 235 because the packets may be dropped before the authentication material 235 reaches the destination (i.e., when the TTL value reaches '0').

As another variation, the policy implemented by the token service 225 may consider any number of aspects of network traversal together in managing provision of the authentication material 235. For example, the token service 225 may look at the remaining TTL value of packets requesting authentication material 235, may look at a port of the server 220 over which the packets were delivered to ensure the packets were received over an acceptable port, may further set an artificially low TTL value for the packets containing the authentication material 235, and may yet further send the packets using a protocol that is non-routable outside of the customer network 205.

Figure 2B:
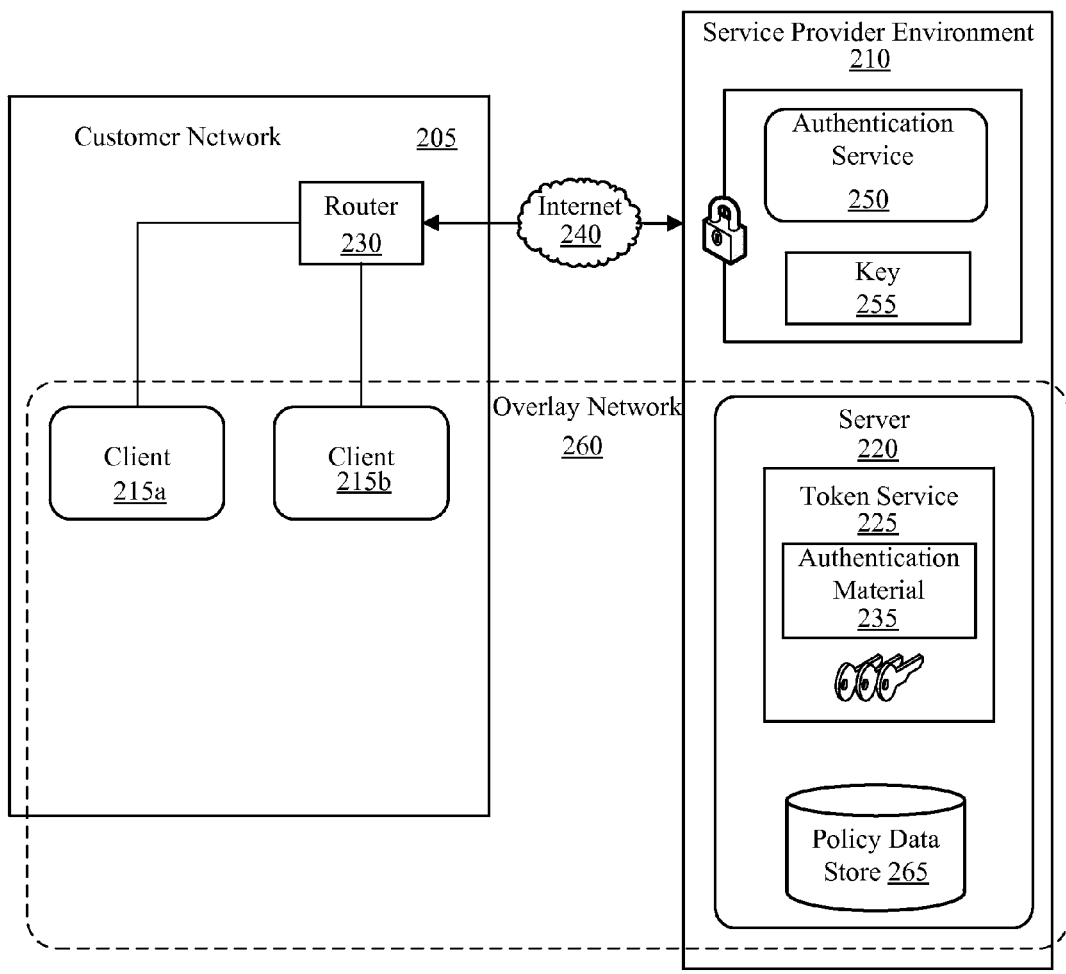
FIG. 2B is a schematic overview of a system for managing authentication material for an API request where clients on a customer network access authentication material from a service provider environment over a virtual private network in accordance with an example of the present technology.

Referring to FIG. 2B, an alternative implementation is illustrated in which the server 220 executing the token service 225 is provided within the service provider environment 210. In this example, clients 215a, 215b may connect to the server 220 over an overlay network 260. One example of an overlay network may be a virtual private network (VPN). The overlay network 260 may extend a private network across a public network, such as the internet, and may enable clients 215a, 215b and server 220 to send and receive data across shared or public networks as if directly connected to the private network, while benefiting from the functionality, security and management policies of the private network. The overlay network 260 may establish a virtual point-to-point connection through the use of dedicated connections, encryption and so forth.

Figure 3:
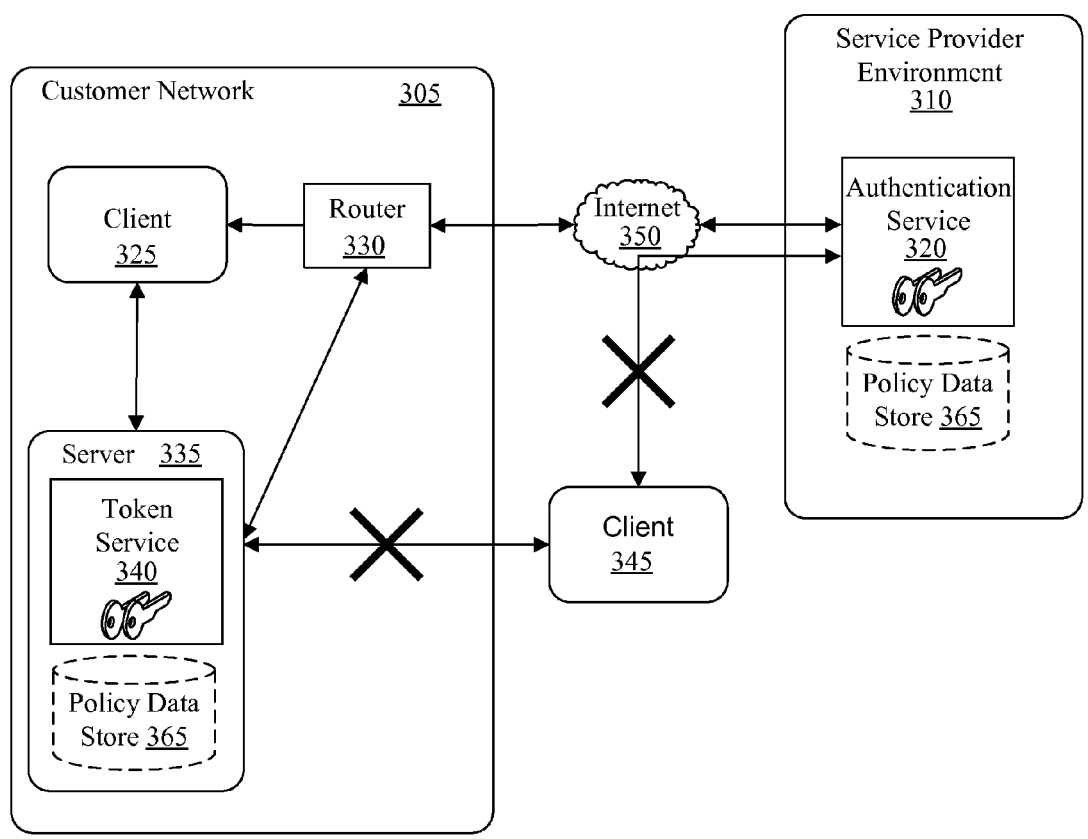
FIG. 3 is a schematic overview of a system for managing authentication material for an API request where a client external to the customer network is restricted from accessing the service provider environment in accordance with an example of the present technology.

FIG. 3 illustrates an example implementation of the present technology where a plurality of clients 325, 345 attempt to receive authentication material from a token service 340 executed on server 335 on customer network 305, and or where the clients 325, 345 attempt to access the service provider environment 310 over the internet 350 by submitting authentication material to an authentication service 320 executed on a within the service provider environment 310. The token service 340 and/or the authentication service 320 may utilize a policy data store 365 in determining whether to vend authentication material, how to vend the authentication material, whether to authorize the authentication material and so forth.

In the example of FIG. 3, a client 325 resides on the customer network 305 and may communicate with the server 335 using a protocol that is non-routable outside of the customer network and/or may be within a set number of hops from the server 335. Therefore, client 325 may receive the authentication material from the token service and may transmit the authentication material to the authentication service 320 over the internet 350, (via router 330). In contrast, another client 345 may be external to the customer network 305 and may be unable to send or receive packets to the server 335 due to the network protocol in use on the customer network 305 and/or due to a number of hops between client 345 and server 335. As a result, the client 345 may be unable to access or receive authentication material from token service 340 and may consequently be unable to access the service provider environment 310.

In one example implementation, the authentication service 320 may be operable to receive a configuration API request, such as from client 325, to configure the policy used by the authentication service in granting the request, or rather to configure enforcement of the policy. For example, the configuration API request may include an instruction to enable, disable or modify the policy. The modified policy may be stored in the policy data store 365.

Figure 4:
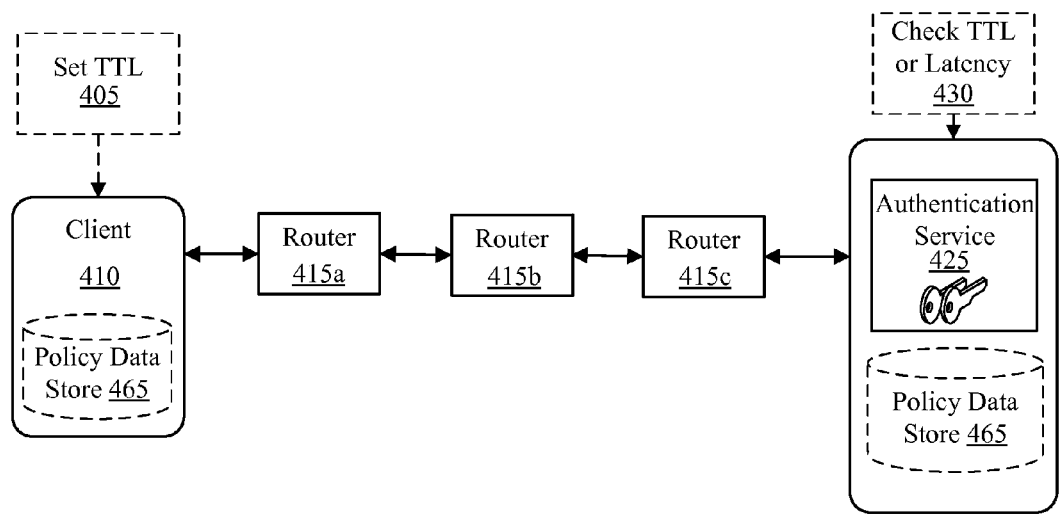
FIG. 4 is a schematic overview of a system for managing authentication material for an API request implemented using a variety of methods for considering network traversal of packets in accordance with an example of the present technology.

Referring to FIG. 4, an example implementation for managing authentication of API requests is illustrated in accordance with the present technology. In this example, the client 410 may send a request to access a network-based service. An authentication service 425 may validate the request by authenticating the authentication material included in the request sent by the client 410.

FIG. 4 may illustrate a number of different methods for managing authentication, any of which may be used individually or in combination with one another. For example, client 410 or another device on a network with client 410 may set a TTL value at 405 for request packets containing the authentication material. A number of hops between client 410 and authentication service 425 (or any other suitable location at the service provider environment) may be known. The TTL value may be set to a defined number of hops between any point on the network and the authentication service 425. If the client 410 is at the defined number of hops, then packets sent to the authentication service 425 may be delivered, but any packets sent from a greater number of hops distant from the authentication service 425 may be dropped. If the TTL value is set at '5', for example, and hops from client 410 are counted beginning at client 410, the TTL value may be decremented to '4' at router 415a, decremented to '3' at router 415b, decremented to '2' at router 415c, and decremented to '1' at authentication service 425. In this example, the packets may have been able to traverse one more hop before being discarded if the destination (i.e., authentication service 425) had not been reached. Thus, a policy in a policy data store 465 may be set or managed by the client 410 or a network or network service from which the client 410 obtains the authentication material and may be used to manage or restrict access to the authentication service 425 by setting a low TTL value.

In another implementation, packets sent from the client 410 to authentication service 425 may be set to include a maximum TTL value, such as a value of '255'. A policy in a policy data store 465 for managing authentication may be maintained at authentication service 425. The policy may restrict authentication of API requests to packets with at least a minimal remaining TTL value. Thus, for example, the policy in the policy data store 465 may define that API requests from packets with a TTL value of lower than '250' are unacceptable and are to be denied. A customer may set the TTL value threshold based on a known or at least estimated number of hops between the authentication service 425 and client 410. When packets arrive requesting authentication, the authentication service 425 may check the remaining TTL value against the TTL value threshold to ensure compliance with the policy.

As another example, a customer may determine an acceptable latency of packets in traversing from client 410 to authentication service 425. When packets arrive, the authentication service 425 may check the latency of the packets by identifying a time stamp of when the packets were sent from client 410 and when the packets were received. When the latency exceeds the acceptable latency, the API request may be denied or dropped. When the latency is within the acceptable latency, the API request may be accepted and processed to validate the authentication material, credentials, etc. In one example, the latency may be determined using a traceroute operation, as is described below.

In another example, the policy enforced by the authentication service 425 may specify that packets are to arrive over a predefined network path or route, such as across routers 415a-415c. When a different network path is taken by the packets, an API request may be dropped. The network path may be identified by performing a traceroute operation. A traceroute operation may involve sending a sequence of Internet Control Message Protocol (ICMP) echo request packets addressed to a destination host (i.e., client 410 from authentication service 425). Traceroute may operate by sending packets with gradually increasing TTL values, beginning with TTL value='1'. The first router (e.g., router 415c) may receive the packets, and decrement the TTL value and drop the packets because the packet then has TTL value '0'. The router may then send an ICMP Time Exceeded message back to the source (e.g., authentication service 425). The next set of packets are given a TTL value of '2', so the first router forwards the packets, but the second router (e.g., router 415b) drops the packets and replies with ICMP Time Exceeded. Proceeding in this way, traceroute uses the returned ICMP Time Exceeded messages to build a list of routers that packets traverse, until the destination (e.g., client 410) is reached and returns an ICMP Echo Reply message. The timestamp values returned for each router along the path are used to determine the delay (latency) values, typically measured in milliseconds for each packet.

In yet another example of policy checking, the authentication service 425 may identify an IP (internet protocol) address of the client 410 and any local metadata about the network location of the client 410 that may be looked up based on the IP address of the client 410. The local metadata and/or other information may include, for example, DHCP lease information, traceroute output and so forth. In one example, client 410 may include with the API request network topology information related to a network topology of the network from which client 410 is sending the request. In another example of policy checking, the authentication service 425 may send a request for network topology information from the client 410 in response to receipt of an API request. The local network topology of the client 410 may be stored in advance by authentication service 425 and compared with the topology provided by client 410 at the time of the request to ensure a match or correspondence, at least within a predetermined degree of error.

Figure 5:
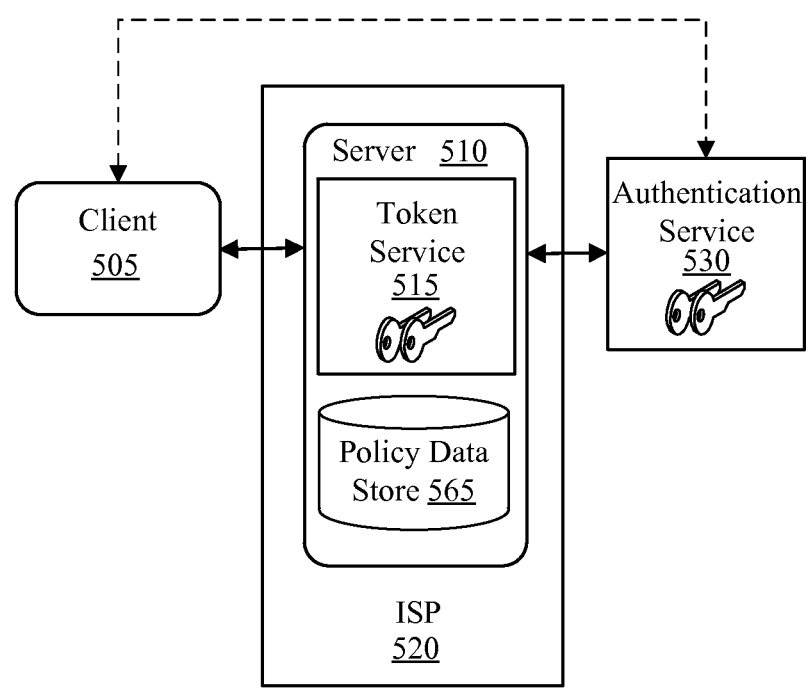
FIG. 5 is a schematic overview of a system for managing authentication material generated at a location other than a client network and a service provider environment in accordance with an example of the present technology.

Referring now to FIG. 5, an example implementation of the present technology is illustrated in which an internet service provider (ISP 520) or any other intermediary party between the client 505 and authentication service 530 provides a service or provides access to the service via the authentication service 530 to a customer at client 505. In this example, the client 505 may request authentication material from a token service 515 via a server 510. The server 510 may optionally send the authentication material to the authentication service 530 on behalf of the client 505 or may send the authentication material to the client 505 for the client 505 to send to the authentication service 530 via server 510 or some other route.

In this example, the ISP 520 may maintain a policy in a policy data store 565 for managing the authentication material. For example, the ISP 520 may send the authentication material to client 505 or authentication service 530 with a low TTL value or may drop requests from the client 505 when the TTL value is below an acceptable TTL value, according to the policy. As another example, the token service 515 may drop requests for authentication material when the requests are not received via a defined port (e.g., port number) of the server 510 or via a defined gateway used by the ISP 520. As another example, the ISP 520 may analyze the network path from client 505 to server 510 or the latency of packets from 505 to determine whether to provide the authentication material. In alternative implementations, the client 505 and/or authentication service 530 may maintain a policy for managing the authentication material according to the examples described herein in addition to or in the stead of ISP 520 maintaining the policies.

In one example, the ISP 520 or client 505 may send API requests to the authentication service 530 over a direct connection. A direct connection is a network service that provides an alternative to using the internet to utilize network-based services. With a direct connection, data that may otherwise be transported over the internet may be instead delivered through a private network connection between the service provider environment and the customer network. With a direct connection, private connectivity may be established between the service provider environment and the customer network, which may increase bandwidth throughput and provide a more consistent network experience than internet-based connections. Network latency over the internet may vary given that the internet is constantly changing how data gets from point A to B. With a direct connection, customers may control how data is routed, which may provide a more consistent network experience as compared with internet-based connections.

The authentication service 530 may comprise or may be hosted on, for example, a server computer, a virtual server image, or any other system providing computing capability. Alternatively, a plurality of servers may be employed that are arranged, for example, in one or more server banks or computer banks or other arrangements to form a distributed computing system.

The client device 505 may access data, services, storage, data stores, reports and so forth over the network. Example client devices may include, but are not limited to, a desktop computer, a laptop, a tablet, a mobile device, a television, a cell phone, a smart phone, a hand held messaging device, a set-top box, a gaming console, a personal data assistant, an electronic book reader, heads up display (HUD) glasses, or any device with a display.

Various processes and/or other functionality, as discussed herein, may be executed according to various examples. A server may, for example, provide some central server processing services while the client device 505 may provide local processing services and interface processing services to interface with the services of the server. Therefore, it is envisioned that the processing services, as discussed herein, may be centrally hosted functionality or a service application that may receive requests and provide output to other services or customer devices.

For example, the services may be considered on-demand computing that is hosted in a server, cloud, grid, or cluster computing system. An application program interface (API) may be provided for each service to enable a second service to send requests to and receive output from the first service. Such APIs may also allow third parties to interface with the service and make requests and receive output from the service. A processor may provide processing instructions by communicating with a memory on the server. In other words, the memory device may include instructions operable to be executed by the processor to perform a set of actions. The processor and/or the memory may directly or indirectly communicate with a data store for storing authentication material, user credentials, user public keys, policies and the like. The processor, memory and the server may be virtualized.

Various data may be stored in the data store that is accessible to the server. The term "data store" may refer to any virtual device or combination of physical and virtual devices capable of storing, accessing, organizing and/or retrieving data, which may include any combination and number of data servers, relational databases, object oriented databases, data storage devices, data warehouses, flat files and data storage configuration in any centralized, distributed, or clustered environment. The storage system components of the data store may include storage systems such as a SAN (Storage Area Network), a cluster storage network, volatile or non-volatile RAM, optical media, or hard-drive type media. The data store may be representative of a plurality of data stores.

The client device 505 shown in FIG. 5 may be representative of a plurality of client devices that may be coupled to the network. The client devices may communicate with the authentication service 530 over any appropriate network, including an intranet, the internet, a cellular network, a local area network (LAN), a wide area network (WAN), a wireless data network or a similar network or combination of networks.

The client device 505 may include a display or display device. The display may comprise, for example, one or more devices such as cathode ray tubes (CRTs), liquid crystal display (LCD) screens, gas plasma based flat panel displays, LCD projectors, or other types of display devices, etc.

The client device 505 may be configured to execute various applications such as a browser, client application and/or other applications. The browser may be executed in a client device 505, for example, to access and render pages, such as web pages or other network data served up by the authentication service 530 and/or other services and/or servers. The client application may be executed to obtain and render for display data from the authentication service 530, or other services and/or local storage media. A client 505 may be a hardware device which is used by the user to access the service provider environment.

In some embodiments, the client application may correspond to code that is executed in the browser or plug-ins to the browser. In other embodiments, the client application may correspond to a standalone application, such as a mobile application. The client 505 may be configured to execute applications beyond those mentioned above, such as, for example, mobile applications, email applications, instant message applications and/or other applications. Users at client devices may access data, such as the processed result of operating information reports, through display devices or through client applications executed in the client devices.

Figure 6:
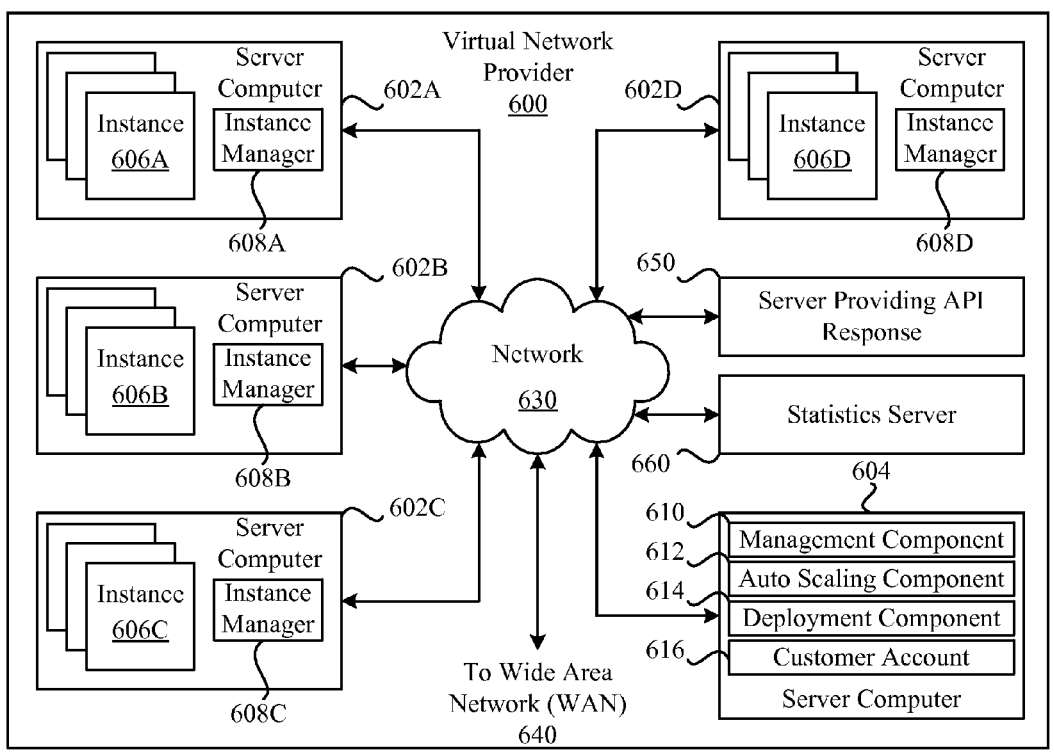
FIG. 6 is a schematic overview of a virtual computing resource provider in accordance with an example of the present technology.

FIG. 6 illustrates how components of a data center may function as a compute service 600 in a service provider environment. As discussed earlier, the compute service 600 (i.e., the cloud provider or service provider) may be capable of delivery of computing and storage capacity as a service to a community of end recipients. In an example embodiment, the compute service may be established for an organization by or on behalf of the organization. That is, the compute service 600 may offer a "private cloud environment." In another embodiment, the compute service 600 may support a multi-tenant environment, wherein a plurality of customers operate independently (i.e., a public cloud environment). Generally speaking, the compute service 600 can provide the following models: Infrastructure as a Service ("IaaS"), Platform as a Service ("PaaS"), and/or Software as a Service ("SaaS"). Other models may also be provided. In some embodiments, end users access the compute service 600 using networked client devices, such as desktop computers, laptops, tablets, smartphones, etc running web browsers or other lightweight client applications. Those skilled in the art will recognize that the compute service 600 can be described as a "cloud" environment.

The particularly illustrated compute service 600 may include a plurality of server computers 602A-602D. While four server computers are shown, any number may be used, and large centers may include thousands of server computers. The server computers 602A-602D may provide computing resources for executing software instances 606A-606D. In one embodiment, the instances 606A-606D may be virtual machines. A a virtual machine may be an instance of a software implementation of a machine (i.e. a computer) that executes applications like a physical machine. In the example of virtual machine, each of the servers 602A-602D may be configured to execute an instance manager 608 capable of executing the instances. The instance manager 608 may be a hypervisor or another type of program configured to enable the execution of multiple instances 606 on a single server. Additionally, each of the instances 606 may be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 may be reserved for executing software components for managing the operation of the server computers 602 and the instances 606. For example, the server computer 604 may execute a management component 610. A customer may access the management component 610 to configure various aspects of the operation of the instances 606 purchased by the customer. For example, the customer may purchase, rent or lease instances and make changes to the configuration of the instances. The customer may also specify settings regarding how the purchased instances are to be scaled in response to demand. An auto scaling component 612 may scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 may consist of a number of subcomponents executing on different server computers 602 or other computing devices. The auto scaling component 612 may monitor available computing resources over an internal management network and modify resources available based on need.

A deployment component 614 may be used to assist customers in the deployment of new instances 606 of computing resources. The deployment component 614 may have access to account information associated with the instances, such as who is the owner of the account, credit card information, country of the owner, etc. The deployment component 614 may receive a configuration from a customer that includes data describing how new instances 606 should be configured. For example, the configuration may specify one or more applications to be installed in new instances 606, provide scripts and/or other types of code to be executed for configuring new instances 606, provide cache logic specifying how an application cache should be prepared, and other types of information. The deployment component 614 may utilize the customer-provided configuration and cache logic to configure, prime, and launch new instances 606. The configuration, cache logic, and other information may be specified by a customer using the management component 610 or by providing this information directly to the deployment component 614.

Customer account information 616 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

A network 630 may be utilized to interconnect the server computers 602A-602D and the server computer 604, 650. The network 630 may be a local area network (LAN) and may be connected to a Wide Area Network (WAN) 640 so that end users may access the compute service 600. It should be appreciated that the network topology illustrated in FIG. 6 has been simplified and that many more networks and networking devices may be utilized to interconnect the various computing systems disclosed herein.

A service providing API response 650 may be a service for providing a response to an API request, such as to process the request, to grant the request, to deny the request and so forth. A statistics server 660 may be used to monitor statistics relating to operation of the virtual computing instances, relating to successful and failed authentication attempts, network traversal of packets involved in authentication attempts and so forth.

Figure 7:
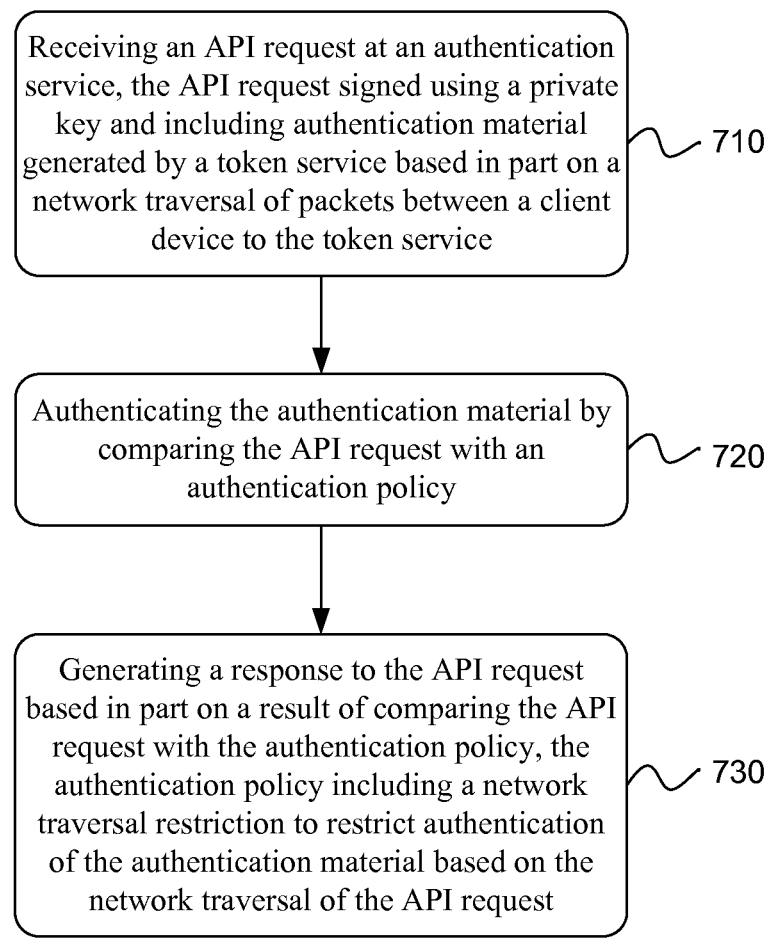
FIG. 7 is a method for managing authentication material for an API request in accordance with an example of the present technology.

Referring now to FIG. 7, a flow diagram of a method for managing authentication material for an API request is illustrated in accordance with an example of the present technology. The method may include receiving 710 an API request at an authentication service. The API request may optionally be signed using a private key and may include authentication material generated by a token service based in part on a network traversal of packets between a client device to the token service. The method may further include authenticating 720 the authentication material by comparing the API request with an authentication policy, or simply "policy". The method may also include generating 730 a response to the API request based in part on a result of comparing the API request with the authentication policy. The authentication policy may include a network traversal restriction to restrict authentication of the authentication material based on the network traversal of the API request.

Network traversal of the API request, or the packets containing the API request and/or the authentication material, may refer to any of the various examples of network traversal or variations thereof described previously. In some examples, the network traversal may include or refer to a network proximity. Network proximity may refer to latency between a source and a destination or to a proximity of the source and destination in terms of hops. Also, network proximity may refer to a connectedness of two devices relative to one another, such as where a client and a token service are proximally located on a same local network. The network traversal may include a network route, such as a path taken by packets to traverse from the source to the destination. The network route may also include ports or gateways through which packets pass through to reach the destination.

In some examples, this or other methods described herein may be implemented wholly or partially as computer readable program code executed by a processor and the computer readable code may be embodied on a non-transitory computer usable medium.

Figure 8:
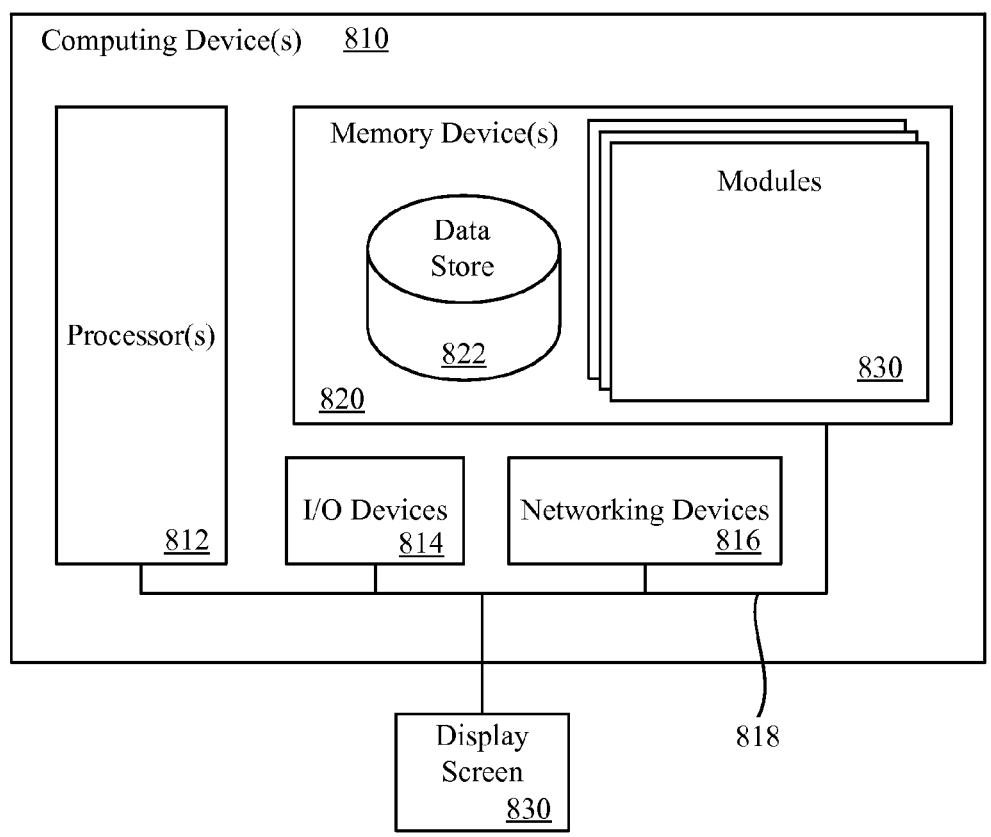
FIG. 8 is a block diagram of a system for identifying virtual computing instance issues in accordance with an example of the present technology.

FIG. 8 illustrates a computing device 810 on which services or modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 830 that are executable by the processor(s) and data for the modules. A data store 822 may also be located in the memory device 820 for storing data related to the modules and other applications along with an operating system that is executable by the processor(s) 812.

The computing device 810 may further include or be in communication with a client device 830, which may include a display device. The client device 830 may be available for an administrator to use in interfacing with the computing device 810, such as to review operation of a virtual computing instance, make improvements to machine learning models and so forth.

Various applications may be stored in the memory device 820 and may be executable by the processor(s) 812. Components or modules discussed in this description that may be implemented in the form of software using high programming level languages that are compiled, interpreted or executed using a hybrid of the methods.

The computing device 810 may also have access to I/O (input/output) devices 814 that are usable by the computing devices. An example of an I/O device 814 is a display screen that is available to display output from the computing devices. Other known I/O device may be used with the computing device as desired. Networking devices 816 and similar communication devices may be included in the computing device 810. The networking devices 816 may be wired or wireless networking devices 816 that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor 812. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A system, comprising:
 a plurality of computing nodes, each of which comprises at least one processor and a memory, wherein the plurality of computing nodes are configured to collectively implement:
 a local network usable to access a service provider environment offered by a service provider external to the local network;
 a first communication protocol for the local network to use to reach the service provider environment;

a token service hosted on the local network to generate authentication material for inclusion with an API request for the service provider environment and to communicate the authentication material over a second communication protocol, the second communication protocol being unusable to communicate with devices external to the local network; and a client to receive the authentication material using the second protocol and to send the API request containing the authentication material to the service provider environment using the first protocol.

2. The system of claim 1, wherein at least a portion of the local network is a virtual network operated by the service provider on behalf of a customer, and the token service is hosted on the virtual network.

3. The system of claim 1, wherein the token service generates the authentication material based at least in part on a proximity of the client to the token service.

4. The system of claim 1, wherein the token service transmits the authentication material with a restriction to limit receiving of the authentication material to clients inside of the local network.

5. A system, comprising:

a client device to send an authentication material request for authentication material to a token service and configured to receive the authentication material from the token service over a second communication protocol unusable external to a local network of the client device, the client device being further configured to send an API request over a first communication protocol usable from the local network to reach a service provider environment when the authentication material is received, the API request including the authentication material to authenticate the client device to an authentication service for access to the service provider environment.

6. The system of claim 5, wherein the client device is authenticated by the authentication service according to an authentication policy based on a network traversal of packets between the client device and the authentication service.

7. The system of claim 6, wherein the network traversal is a Time To Live (TTL) value or a latency of the packets.

8. The system of claim 6, wherein the authentication policy defines a network traversal restriction including a specification of a network route over which the API request is to be sent.

9. The system of claim 5, wherein the authentication material is generated by the token service when the client device is within a predetermined number of hops from the token service.

10. The system of claim 5, wherein the authentication material is carried by at least one packet that includes a time to live (TTL) value of a defined number of hops equal to a number of hops between the token service and a furthest location on a network hosting the token service.

11. The system of claim 5, wherein the authentication material is carried by at least one packet that includes a time to live (TTL) value of a defined number of hops equal to a number of hops between the authentication service and a furthest location on a network hosting the token service.

12. A non-transitory computer readable medium comprising computer-executable instructions which, when executed by a processor, operate as a system for sending an API request, comprising a token service being operable to:

receive a request for authentication material usable by a service provider;

determine a network proximity of the request;

generate the authentication material based on an authentication policy and the network proximity, the authentication policy including a network proximity restriction; and provide the authentication material in response to the request.

13. The computer readable medium of claim 12, wherein the token service is hosted on a local network that is local to a client device from which the request is originated, and the token service provides the authentication material to the client device using a protocol that is non-routable outside the local network.

14. The computer readable medium of claim 12, wherein the token service is operable to coordinate the authentication material with a remote authentication service external to a network hosting the token service.

15. The computer readable medium of claim 12, wherein the authentication material is generated when a client device sends the request via a defined port.

16. A system for receiving an API request, comprising:

a plurality of computing nodes, each of which comprises at least one processor and a memory, wherein the plurality of computing nodes are configured to collectively implement:

an authentication service to receive a request to access a service, the authentication service being configured to obtain client proximity information associated with the request and further configured to grant the request based in part on the obtained client proximity information using a policy that includes client proximity based restrictions.

17. The system of claim 16, wherein the authentication service is operable to receive a configuration API request to configure the policy used by the authentication service in granting the request, the configuration API request including an instruction to enable, disable or modify the policy.

18. A system as in claim 16, further comprising:

a policy data store for storing the policy for use by the authentication service in determining whether to grant access to the service by the client device; and the authentication service comprises an authentication module to receive the request and to grant the request based in part on the policy.

19. The system of claim 16, wherein the authentication service is configured to reject the API request when a remaining TTL value of the API request is less than a predetermined value.

20. The system of claim 16, wherein the authentication service is configured to reject the API request when a latency of the API request from the client device to the authentication service is greater than a predetermined value.

21. The system of claim 16, wherein the authentication service is operable to enforce at least one restriction on a network path associated with the API request.

22. The system of claim 16, wherein the client proximity information comprises authentication material vended by a token service on a network local to a client device from which the request originated.

* * * * *